United States Patent
Terry

(10) Patent No.: US 6,551,641 B1
(45) Date of Patent: Apr. 22, 2003

(54) FISH, POULTRY, MEAT PROCESSING METHOD

(75) Inventor: Mark Terry, Pocatello, ID (US)

(73) Assignee: Global Food Technologies, Inc., Pocatello, ID (US)

( * ) Notice: Subject to any disclaimer, the term of this patent is extended or adjusted under 35 U.S.C. 154(b) by 0 days.

(21) Appl. No.: 09/713,526

(22) Filed: Nov. 13, 2000

(51) Int. Cl.⁷ ................................................ A23B 4/06
(52) U.S. Cl. .................. 426/332; 426/321; 426/324; 426/326; 426/524
(58) Field of Search .................. 426/332, 321, 426/324, 326, 399, 524, 652, 641, 327, 335, 323

(56) References Cited

U.S. PATENT DOCUMENTS

| | | |
|---|---|---|
| 1,507,328 A | 9/1924 | Babigian et al. |
| 1,696,704 A | 12/1928 | Zellner |
| 2,440,911 A | 5/1948 | Pancoast |
| 2,522,535 A | 9/1950 | Pryor et al. |
| 2,860,056 A | 11/1958 | Bradford ...................... 99/194 |
| 3,240,026 A | 3/1966 | Van Dolah et al. ............. 62/63 |
| 3,745,026 A | 7/1973 | Hansen et al. ................. 99/194 |
| 3,898,854 A | 8/1975 | McSheehy et al. ............ 62/62 |
| 4,015,366 A | 4/1977 | Hall |
| 4,367,630 A | 1/1983 | Bernard et al. ................. 62/63 |
| 4,421,823 A | 12/1983 | Theisen et al. ............. 428/349 |
| 4,626,456 A | 12/1986 | Farrell et al. ................. 428/35 |
| 4,849,237 A * | 7/1989 | Hurst .......................... 426/332 |
| 4,862,557 A | 9/1989 | Clayton et al. ................ 17/1 R |
| 5,143,739 A * | 9/1992 | Bender et al. ............... 426/332 |
| 5,595,066 A | 1/1997 | Zwanikken et al. .......... 62/374 |
| 5,632,676 A * | 5/1997 | Kurschner et al. .......... 452/173 |
| 5,711,980 A * | 1/1998 | Terry .......................... 426/392 |
| 5,939,115 A | 8/1999 | Kounev et al. ............. 426/238 |
| 6,050,391 A * | 4/2000 | Terry .......................... 198/495 |
| 6,066,348 A * | 5/2000 | Yuan et al. .................. 426/336 |
| 6,103,286 A | 8/2000 | Gutzmann et al. .......... 426/332 |
| 6,106,956 A | 8/2000 | Heyn et al. ................. 428/516 |
| 6,200,618 B1 * | 3/2001 | Smith et al. ................. 426/320 |

FOREIGN PATENT DOCUMENTS

WO    WO8303522 A    * 10/1983

OTHER PUBLICATIONS

Perry et al. Perry's Chemical Engineers' Handbook, Seventh Edition, 1997, p. 17–51.*

* cited by examiner

Primary Examiner—Milton I. Cano
Assistant Examiner—Robert Madsen
(74) Attorney, Agent, or Firm—Fenwick & West LLP

(57) ABSTRACT

Processing apparatus and method for fish, poultry and meat products include multiple successive immersions in sanitizing solutions at different successive temperatures within controlled environments to promote low contamination during transfer of product between processing stations in preparation for encapsulation within a controlled environment confined within a barrier of composite sheet material that controls the transfer of selected gases therethrough.

11 Claims, 2 Drawing Sheets

FISH, POULTRY, MEAT PROCESSING METHOD

RELATED CASES

The subject matter of this application is related to the subject matter of U.S. Pat. No. 5,711,980 issued on Jan. 27, 1998 to M. Terry, and to the subject matter of U.S. Pat. No. 6,050,391 issued on Apr. 18, 2000 to M. Terry, which subjects matter are incorporated herein by this reference.

FIELD OF THE INVENTION

This invention relates to equipment and processes for processing and packaging fresh fish or poultry or meat to retard deterioration and promote extended shelf life.

BACKGROUND OF THE INVENTION

Fish, poultry and meat products are commonly processed from catch or slaughter to market distribution in cold or frozen condition to retard the rate of decay of the product attributable to microorganisms present in the product. Extended shelf lives for such products commonly result from maintaining the products in frozen conditions during final processing, packaging, distribution and display. However, for such products that are not conducive to processing, packaging, distribution or display in frozen condition, icing down or otherwise refrigerating such products to cool, non-frozen condition is an alternative procedure that attains some extension of shelf life though not as extensively as in frozen condition. However, frozen product once thawed and non-frozen product commonly deteriorate rapidly out of an iced or refrigerated environment, attributable to microorganisms present on the surface of the product as well as within the product that remain present from initial processing and that are capable of rapid proliferation at elevated temperatures. In contrast to fresh produce that may be harvested in the field or orchard or vineyard and that is inherently immune from deterioration at the moment of harvest, fleshy products of fish, poultry and meat are notoriously more prone to rapid deterioration from the moment of catch or slaughter.

SUMMARY OF THE INVENTION

In accordance with the present invention, fish, poultry and meat products are initially processed through a series of diverse environments that tend to cycle the respiration rates of the product and significantly diminish the internal and surface concentrations of pathogens which affect decay of the product at elevated temperatures. The resultant product exhibits extended shelf life, even after freezing and thawing, and appealing marketability for enhanced product sales with reduced losses over longer processing, distribution and retailing intervals.

DETAILED DESCRIPTION OF THE INVENTION

Figure 1:
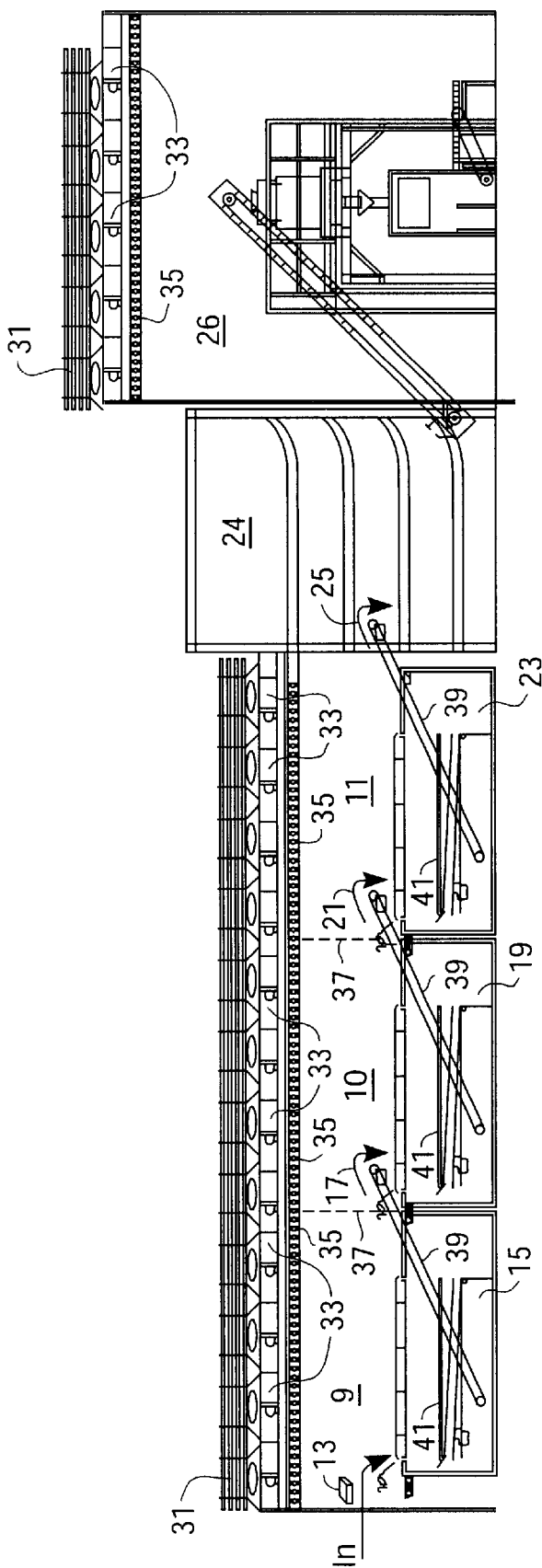
FIG. 1 is a pictorial diagram of successive environments for processing product in accordance with the present invention.
Figure 2:
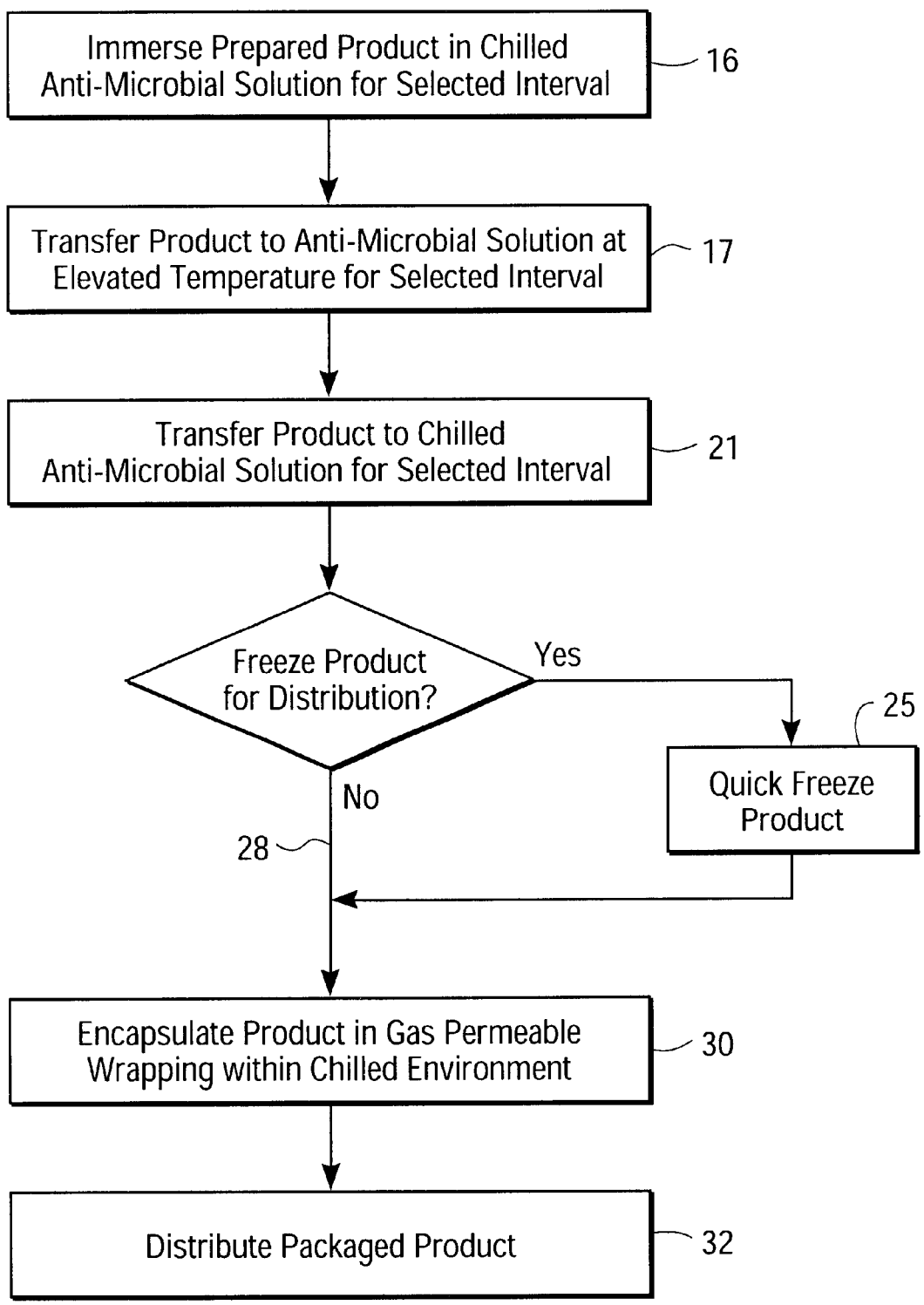
FIG. 2 is a flow chart illustrating the process of the present invention.

Referring now to FIGS. 1 and 2, there are shown pictorial diagrams of a product processing line and process containing several environments through which product 13 is processed according to the present invention, as illustrated in the flow chart of FIG. 2. Specifically, three successive environments 9,10,11 are assembled to receive fish, poultry or meat products 13 previously cleaned, scaled, filleted, or otherwise prepared or dressed from the initial natural state following catch or slaughter of the host animal. The first environment 9 includes a tank 15 containing a sanitizing solution of water and an anti-microbial agent such as peroxyacetic acid as a colorless, odorless, tasteless composition (commercially available as TSUNAMI 100) which is cooled to approximately 32°–35° F. and is circulated in the tank 15 at a concentration of about 85 parts per million parts water. The surrounding ambient conditions within environment 9 include air temperature at about 33°35° F. with relative humidity of about 98%. Product 13 is initially immersed 16 in the aqueous solution within tank 15 for about 1–3 minutes to effectively thermally shock the product, which is believed to elevate the cell respiration rate and prepare the product for the next processing environment. The dwell time of approximately 3 minutes ensures substantial reductions in surface bacterial concentrations at logarithmic rates per unit time of immersion, as is commonly known in the food processing industry. Products 13 of larger unit volumes greater than a cut size of about 10 pounds may require additional immersion time to accomplish comparable shock elevation of cell respiration rates and reductions in surface bacterial concentrations.

The product thus 'shocked' to a state of elevated cell respiration is then transferred 17 to the second environment 10 for immersion in a tank 19 containing an aqueous solution similar to the solution contained in tank 15 and that is circulating at a temperature of about 70°–105° F. The surrounding ambient conditions within environment 10 include air temperature at about 60°–95° F. with relative humidity of about 98%. It is believed that exposure of the product 13 to this sudden increase in temperature while at an elevated cell respiration rate expands the cell matrix and cell structure (vacuole) of the product analogous to opening up the pores of the product, and this facilitates increased penetration of the anti-microbial liquid agent into the cell matrix and cell structure (vacuole). This facilitates more thorough penetration of the product by the anti-microbial liquid agent in tank 19 which is thus rendered more effective in destroying pathogens within the cell matrix of the product 13. The product 13 remains immersed in tank 19 for about 3–7 minutes (dependent in part upon cut size and batch size) to affect substantial reductions in both the internal pathogens and any remaining surface bacteria, at rates of diminishing concentrations that vary logarithmically with time, in a manner that is commonly known in the food processing industry.

The product 13 thus elevated in temperature and exhibiting enhanced absorption of the anti-microbial liquid agent in tank 19 is then transferred 21 to the third environment 11 for immersion in tank 23 containing an aqueous solution similar to the solution contained in tank 15 and that is circulating at a temperature of about 32°–35° F. The surrounding ambient conditions within environment 11 include air temperature of about 33°–35° F. with relative humidity of about 98%. This sudden decrease in temperature lowers the cell respiration rate of the product 13 to near dormancy state and promotes expulsion of absorbed liquids. The product 13 remains immersed in the tank 23 for approximately 5–10 minutes (dependent in part upon cut size and batch size) to ensure maximum expulsion of absorbed liquid and to effect substantial reductions in remaining bacterial concentrations at logarithmic rates per unit time, in a manner that is commonly known in the food processing industry.

The product is then removed from the environment 11 and is transported 25 either to quick-freezing environment 24, or directly 28 to packaging facilities 26 within a cooled environment operating at a temperature of about 33° to 35° F. The product 13 thus transported (either via quick-freezing facility 24, or directly) to the packaging facilities 26 thus remains in dormant (or frozen) state with substantially reduced levels of pathogens that can adversely affect the deterioration of the product 13 thus processed according to the present invention.

Referring still to FIG. 1, the temperature and humidity and air purity conditions within the environments 9, 10, 11, 26 are carefully controlled in response to the air conditioning equipment that is shown assembled above each environment. Specifically, cooling coils 31 are disposed with respect to modular blower or fan units 33 that may be assembled in modular arrays with respect to each environment 9, 10, 11 and packaging facility 26 to transfer cooled air from about the coils 31 through fine HEPA filters 35 to the respective environments. Specifically, the HEPA filters 35 are selected to restrict passage therethrough of particles and contaminants not greater than about 0.3 $\mu$ dimension, which therefore effectively filters out most, if not all, bacterial and pathogenic airborne contaminants. Such filters may also be assembled in modular arrays of about 2 foot by 4 foot panels for convenient cleaning and other servicing. Additionally, permeable curtains 37 such as overlapping vertical-hanging flexible strips of polyvinyl chloride (PVC) plastic material are disposed between environment 9, 10, 11 to facilitate maintaining temperature differentials in the adjacent environments 9, 10 and 10, 11.

The product 13 is transported between environments by conveyor mechanisms 39 which retrieve product 13 from the immersion tank 15, 19, 23 in one environment for transport to the next environment. And, within each immersion tank 15, 19, 23, the product 13 is kept moving through the immersion liquid composition by submerged conveyor mechanisms 41. In this way, dwell times of product 13 within each tank 15, 19, 23 may be controlled by the rate of movement of the submerged conveyor mechanism from an entry location for incoming product 13 to an exit location for outgoing product 13. And, the volumetric capacity of the tanks 15, 19, 23 may be sized proportionally to the dwell time of product 13 in each tank. Alternatively, the rate of product 13 entering environment 9 may be limited by the capacity of tank 23 that requires the longest product dwell time. In this way, continuous processing of product 13 may be accomplished without backup of product 13 into the slowest processing environment.

Where desirable, product 13 emerging 25 from the last processing environment 11 may be quick frozen in conventional manner within the freeze processing environment 24 for transfer to the final packaging phase in environment 26. Alternatively, product 13 emerging from the last processing environment 11 may be transferred 25 directly to the final packaging phase where frozen product is not desirable. The packaging environment 26 is also maintained at about 33° F. and relative humidity of about 98% via the cooling coils 31 and blower or fan modules 33 and HEPA filters 35, in the manner as previously described. In this environment, frozen product 13 transferred from the quick freeze environment 24 has only brief exposure time to non-freezing environment and has no opportunity to thaw while being wrapped and sealed or otherwise encapsulated 30 for retail distribution 32 under sustained freezing temperatures during transport and storage. Alternatively, product 13 transferred from environment 11 remains in non-frozen but dormant state during the brief interval while being wrapped and sealed or otherwise encapsulated 30 for retail distribution 32 under sustained near-freezing temperature during transport and storage.

Figure 3:
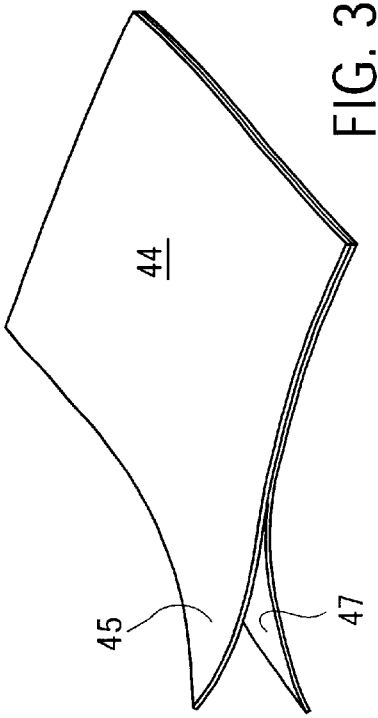
FIG. 3 is a perspective view of a composite sheet material that is suitable for wrapping the processed product to selectively control the aspiration rate thereof.

Referring now to FIG. 3, there is shown a composite flexible sheet material 44 that is applied to product 13 following processing thereof as previously described in accordance with the present invention. The composite sheet material 44 is formed as bonded layers of polyethylene film 45 over polypropylene film 47. This composite sheet material 44 is preferred as a sealing wrap about product 13 in frozen or dormant state for transportation and storage at the respective requisite temperatures during retail distribution because of the desirable gas permeability of such composite sheet material. Specifically, it has been discovered that such composite sheet material 44 transfers oxygen and carbon dioxide, among other gases, in a manner that retains an internal modified atmosphere of typically more than about 13% oxygen and less than about 5.5% carbon dioxide. The transmission rate of gases through the composite sheet material 44 may be altered by varying the thicknesses of the films 45, 47 that comprise the sheet material 44. Specifically, it has been determined that, for a thickness of the polypropylene film 45 of about 1.0–3.0 mils, and a thickness of the polyethylene film 47 of about 0.5–3.0 mils, the composite sheet material is capable of transferring about 0.01–50 microliters of oxygen per hour at freezing or near-freezing temperatures (dependent upon headspace analysis determinations of the respiration rates of the individual products 13 and their associates cuts). Such permeability with respect to oxygen is believed to benefit the product 13 wrapped and sealed in such composite sheet material because of the resultant reductions in excess oxygen available to accelerate the known KREBS cycle (i.e., the breakdown of carbon compounds generated during the decaying process limits or retards the decaying process). As the KREBS cycle, or decay cycle, is a resultant of carbolic actions taking place on and within the product 13 to generate carbon compounds, the modified environment in which the product 13 is sealed is significantly altered, in that, the amount of bacteria/pathogens/particulates in the modified atmosphere is significantly less, and the ability to break down the complex carbon compounds via excess oxygen in the sealed environment is significantly reduced.

The resultant is a much slower growth of bacteria and a retarding of the KREBS cycle, and the apparatus and process of the present invention thus greatly reduce pathogenic contaminants that contribute to the deterioration of animal products prepared for retail distribution, and thereby significantly increase retail shelf life and sanitary packaging of such products.

What is claimed is:

1. A method for processing fish, poultry or meat products, comprising the steps for:

immersing the product in a sanitizing solution at approximately 32°–35° F. for a first time interval;

after the first time interval, immersing the product for a second time interval in a sanitizing solution at a higher temperature than the solution temperature during the first interval and within the range of approximately 70°–105° F.;

after the second time interval, immersing the product for a third time interval in a sanitizing solution at a lower temperature than the solution temperature during the second time interval and within the range of approximately 33°–35° F.; and after the third time interval, preparing the product for distribution.

2. The method according to claim 1 in which the third time interval is longer than the second time interval which is longer than the first time interval.

3. The method according to claim 1 in which ambient air conditions around an immersion of the product include relative humidity of about 98%.

4. The method according to claim 1 in which the sanitizing solution includes an anti-microbial agent in a concentration of about 85 parts to one million parts water.

5. The method according to claim 1 in which preparing the product for distribution includes enclosing the product within a confining package within a packaging environment including air temperature of about 33° F. and relative humidity of about 98%.

6. The method according to claim 1 including filtering the air within an environment surrounding processing of the product through HEPA filtration which filters out particulate matter down to approximately 0.3 micron dimensions.

7. The method according to claim 1 in which preparing the product for distribution includes freezing the product after the third time interval.

8. A method for processing animal food products comprising the steps for:

subjecting the product to a fluid environment at a temperature of approximately 32°–35° during a first time interval for elevating the respiration rate of cells contained in the animal product;

after the first time interval, subjecting the product to a fluid environment for a second time interval at a higher temperature than the fluid temperature during the first time interval and within the range of approximately 70°–105° F. for expanding the matrix or vacuole of the cells contained in the animal product; and after the second interval, subjecting the product to a fluid environment for a third interval at a lower temperature than the fluid temperature during the second time interval and within the range of approximately 33°–35° F. for decreasing the respiration rate of the cells toward dormancy.

9. The method according to claim 8 in which the third time interval is longer than the second time interval which is longer than the first time interval.

10. The method according to claim 8 including, after the third time interval, encapsulating the product substantially while at the level of cell respiration rate attained during the third time interval for preserving a reduced level of pathogens capable of deteriorating the animal product.

11. The method according to claim 10 including freezing the encapsulated product.

* * * * *